US011757343B2

(12) United States Patent
Lewis et al.

(10) Patent No.: US 11,757,343 B2
(45) Date of Patent: Sep. 12, 2023

(54) POWER SUPPLY MONITORING AND SWITCHING CONTROL

(71) Applicant: Infineon Technologies Austria AG, Villach (AT)

(72) Inventors: David Lewis, Reading, MA (US); Benjamim Tang, Rancho Palos Verdes, CA (US); Venkat Sreenivas, Winchester, MA (US)

(73) Assignee: Infineon Technologies Austria AG, Villach (AT)

( * ) Notice: Subject to any disclaimer, the term of this patent is extended or adjusted under 35 U.S.C. 154(b) by 175 days.

(21) Appl. No.: 17/323,412

(22) Filed: May 18, 2021

(65) Prior Publication Data

US 2022/0376598 A1    Nov. 24, 2022

(51) Int. Cl.
| | | |
|---|---|---|
| *H02M 1/00* | (2006.01) | |
| *H02M 1/08* | (2006.01) | |
| *H02M 1/36* | (2007.01) | |
| *H02M 3/158* | (2006.01) | |

(52) U.S. Cl.
CPC ........... *H02M 1/0006* (2021.05); *H02M 1/08* (2013.01); *H02M 1/36* (2013.01); *H02M 3/158* (2013.01)

(58) Field of Classification Search
CPC ........ H02M 1/0006; H02M 1/08; H02M 1/36; H02M 3/158
See application file for complete search history.

(56) References Cited

U.S. PATENT DOCUMENTS

| | | | |
|---|---|---|---|
| 10,666,142 B2 | 5/2020 | Vanin et al. | |
| 2004/0113600 A1* | 6/2004 | Hoshino | H02M 3/156 323/284 |
| 2018/0351452 A1* | 12/2018 | Clavette | H03K 4/08 |
| 2021/0199524 A1* | 7/2021 | Hsu | G01L 9/0073 |

FOREIGN PATENT DOCUMENTS

| | | | | |
|---|---|---|---|---|
| JP | 2018129910 | * | 8/2018 | ............ H02M 3/155 |
| JP | 6837344 B2 | | 3/2021 | |

OTHER PUBLICATIONS

Extended Search Report, EP 22 17 3864, dated Oct. 6, 2022, pp. 1-10.

* cited by examiner

*Primary Examiner* — Adolf D Berhane
*Assistant Examiner* — Afework S Demisse
(74) *Attorney, Agent, or Firm* — Armis IP Law, LLC

(57) ABSTRACT

An apparatus includes a soft start manager such as implemented via hardware, software, or a combination of hardware and software. The soft start manager receives input parameter from a power supply; the input parameter (such as output voltage, duty cycle, input voltage, etc.) is associated with conversion of the input voltage into an output voltage that powers a load. The soft start manager monitors a magnitude of the input parameter. Based at least in part on the magnitude of the input parameter, the soft start manager controls a switching period applied to switch circuitry in the power supply.

34 Claims, 10 Drawing Sheets

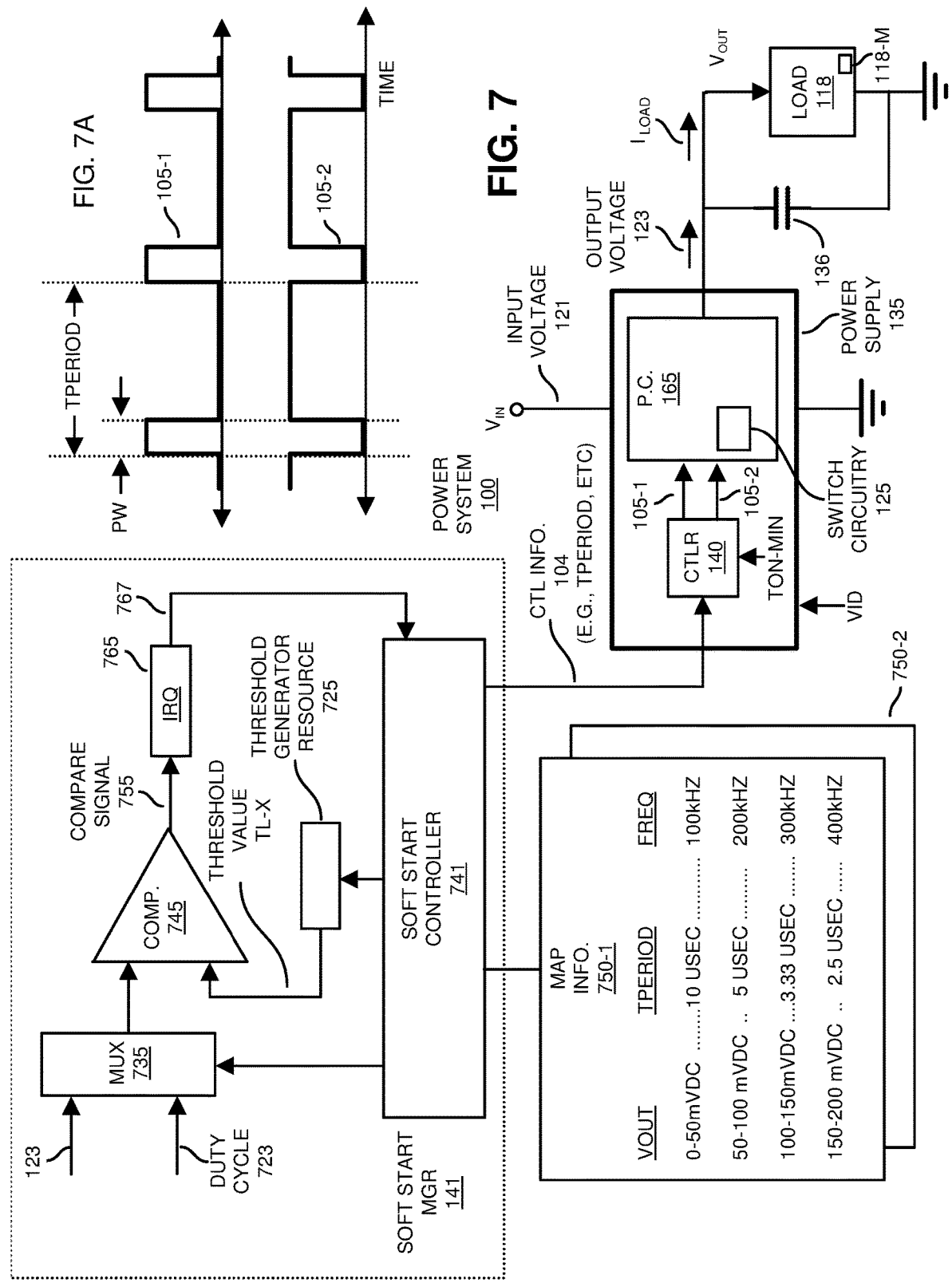

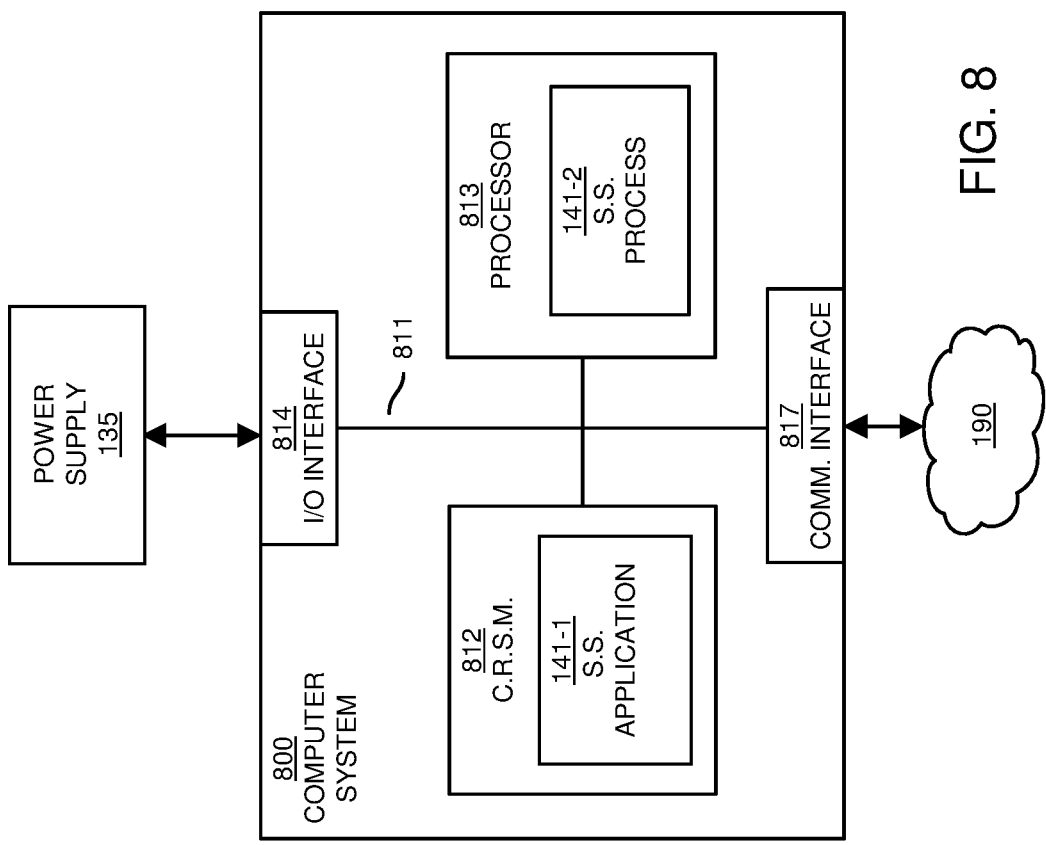

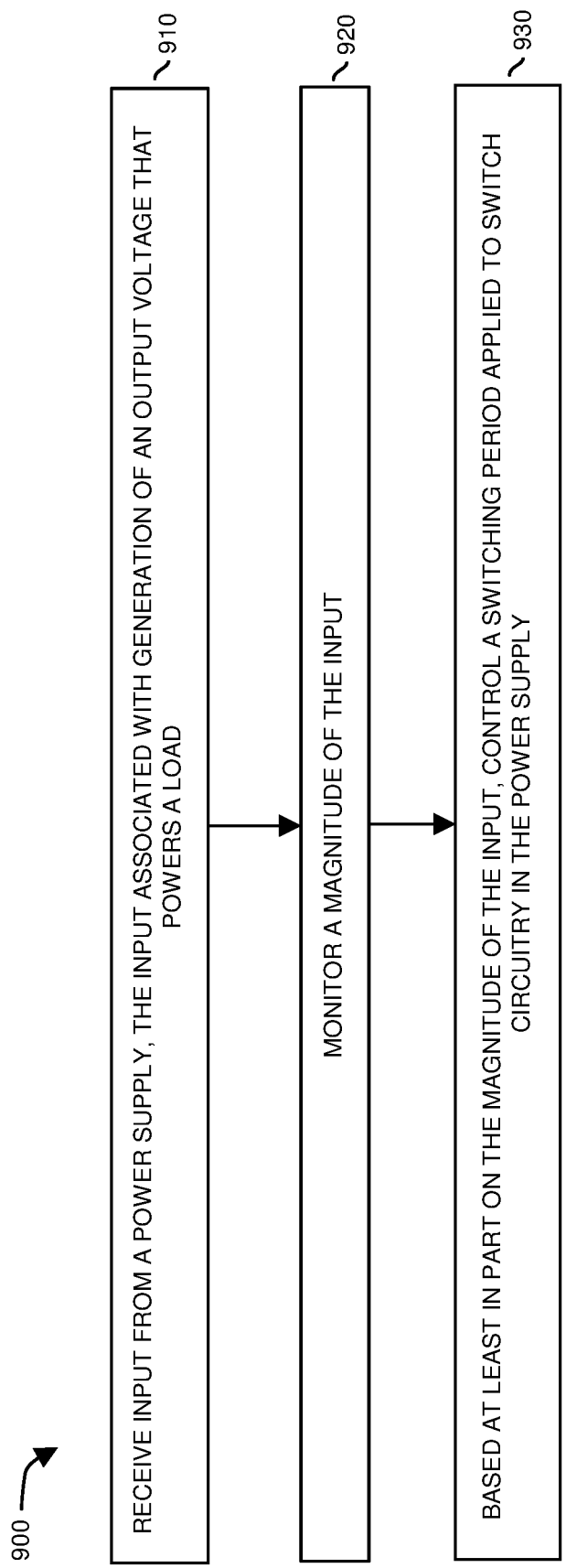

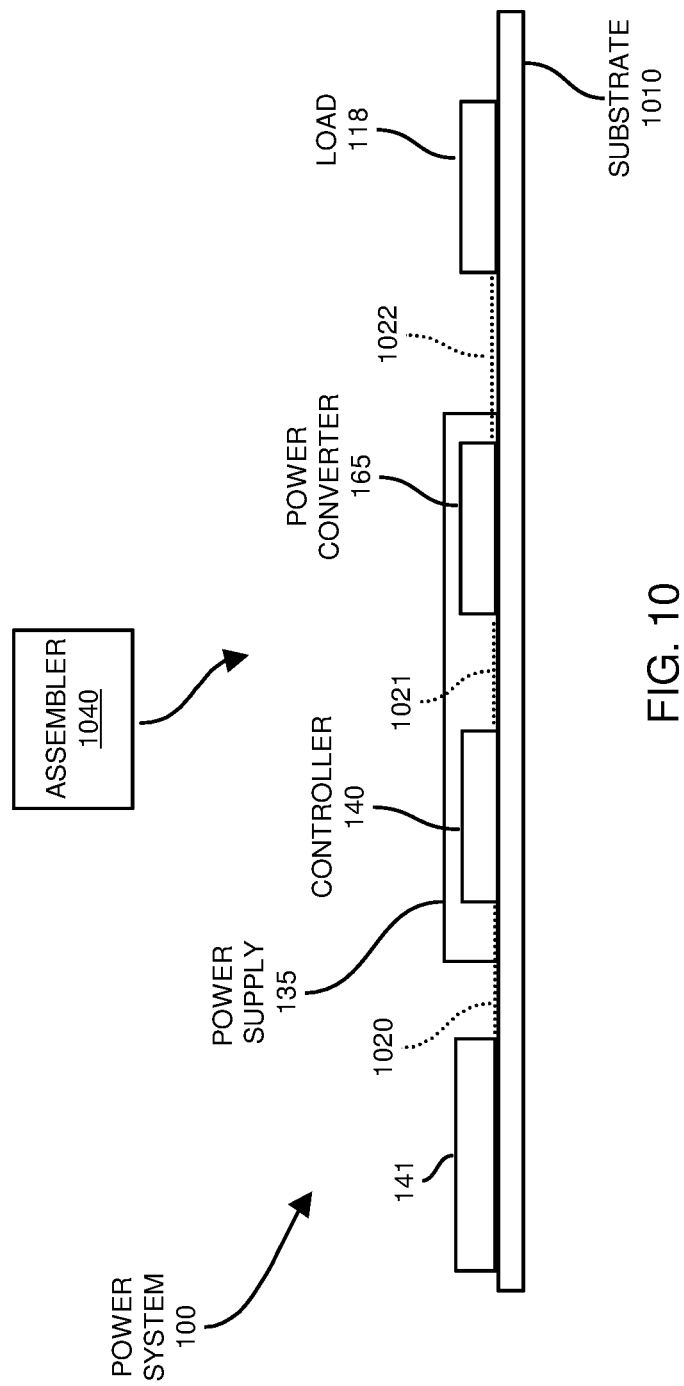

POWER SUPPLY MONITORING AND SWITCHING CONTROL

BACKGROUND

One type of conventional power converter is a voltage regulator. In general, to maintain an output voltage within a desired range, a controller in the voltage regulator compares the magnitude of a generated output voltage to a setpoint reference voltage. Based on a respective error voltage derived from the comparison, the controller modifies a respective switching frequency and/or pulse width modulation associated with activating high side switch circuitry and low side switch circuitry in the voltage regulator.

Conventional power converters can be configured to receive a voltage value (such as a so-called VID value) indicating a desired output voltage setting. The VID voltage value may vary over time depending on system operation. The conventional voltage regulator uses the VID value as the setpoint reference voltage. Accordingly, a device generating the VID value is able to control a magnitude of the output voltage.

Further, in certain instances, a conventional voltage regulator includes so-called soft start capability. In general, soft start capability includes controlling a rate of ramping a voltage applied to a respective load, preventing damage to it.

BRIEF DESCRIPTION

Implementation of clean energy (or green technology) is very important to reduce human impact on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator or voltage source.

Regardless of whether energy is received from green energy sources or non-green energy sources, it is desirable to make most efficient use of raw energy (such as storage and subsequent distribution) provided by such sources to reduce our impact on the environment. This disclosure contributes to reducing our carbon footprint and providing better use of energy via more efficient energy conversion.

This disclosure further includes the observation that conventional implementation of soft start capability in a power converter suffers from deficiencies. For example, in certain instances, a power converter is programmed to implement a minimum fixed ON-time value of respective high side switch circuitry. The fixed ON-time value may be implemented during a standard operational mode as well as during implementation of a soft start mode. If a fixed frequency controller implements a programmed minimum ON-time value without skipping PWM pulses during soft start, a plateau voltage effect typically exists on the voltage ramp where a magnitude of the voltage at the plateau is the equivalent of the minimum duty cycle times voltage input. In other words, the magnitude of the output voltage generally cannot be controlled to a desired value for lower magnitudes of the output voltage near (where the plateau exists). With slower ramp slew rates, this issue is more prominently seen as the minimum ON time is enforced for much longer. This so-called voltage plateau effect prevents regulation of the output voltage at lower voltage levels, resulting in limited power converter performance.

Embodiments herein include novel ways of controlling a switching period during implementation of a minimum ON-time value to produce an output voltage via a power supply.

More specifically, embodiments herein include an apparatus such as a power supply including a soft start manager. The soft start manager controls generation of an output voltage. For example, the soft start manager receives input (such as one or more parameters of information) from the power supply; the input (such as an input parameter) is associated with generation of an output voltage that powers a load. The soft start manager monitors a magnitude of the input associated with one or more parameters. Based at least in part on the magnitude of the input, the soft start manager controls a switching period applied to switch circuitry in the power supply.

Note that the input (such as one or more input parameters) can be any suitable one or more parameters associated with the power supply. For example, in one embodiment, the input parameter monitored by the soft start manager is a magnitude of the output voltage. Additionally, or alternatively, the input parameter is a duty cycle of activating the switch circuitry in the power supply.

In one embodiment, the duty cycle represents a ratio value of an input voltage and the output voltage; the power supply converts the input voltage into the output voltage.

In yet further example embodiments, the switch circuitry of the power supply as discussed herein is high side switch circuitry. In one embodiment, the power supply is programmed to implement a minimum pulse width of activating the high side switch circuitry during soft start of the output voltage. Control of the switching period during soft start provides better regulation of the output voltage.

In further example embodiments, the power supply includes or implements a PID (Proportional-Integral-Derivative) controller to convert an input voltage into the output voltage; the soft start manager modifies settings of the PID controller of the power supply based on the monitored parameters (such as magnitude of the output voltage, duty cycle, input voltage, etc.).

Further embodiments herein include, via the soft start manager, controlling activation of the switch circuitry and generation of the output voltage during soft start of ramping the output voltage up or down to a target voltage.

Still further example embodiments herein include, via the soft start manager, varying a magnitude of the switching period applied to the switch circuitry in the power supply depending on the magnitude of the output voltage.

In yet further example embodiments, the soft start manager controls ramping of the magnitude of the switching period over time; the ramping of the switching period results in ramping of the magnitude of the output voltage. In one embodiment, the ramping of the magnitude of the switching period over time substantially aligns or coincides with ramping of a magnitude of the output voltage. In other words, a magnitude of the output voltage ramps as a magnitude of the switching period is ramped over time.

In further example embodiments, a magnitude of the switching period is inversely related to the magnitude of the output voltage. For example, the switching period is larger for lower output voltage magnitudes. Note that the operations as discussed herein can be implemented in any type of controller such as current mode controller, voltage mode controller, etc.

Yet further embodiments herein include, via the soft start manager, monitor an input voltage used by the power supply to produce the output voltage; and control the switching period applied to the switch circuitry in the power supply based on the magnitude of the input voltage and/or the magnitude of the output voltage.

To provide stable operation of generating the output voltage, the soft start manager implements hysteresis during control of the switching period.

In yet further example embodiments, the soft start manager repeatedly communicates switching period control information to the power supply. The soft start manager receives feedback from the power supply; the feedback indicates a status of executing the switching period control information by the power supply.

Further example embodiments herein include, via the soft start manager, receiving one or more interrupt request notifications in response to detection of a condition in which the magnitude of the input parameter falls below a threshold value. In such an instance, each of the received interrupt requests causes the soft start manager to execute instructions to control/adjust the switching period applied to the switch circuitry in the power supply.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: during soft start: receive an input parameter from a power supply, the input parameter associated with generation of an output voltage that powers a load; monitor a magnitude of the input parameter; and based at least in part on the magnitude of the input parameter, control a switching period applied to switch circuitry in the power supply.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more voltage converters to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a further summary of embodiments) and corresponding figures of the present disclosure as further discussed below.

BRIEF DESCRIPTION OF THE DRAWINGS

FIG. 7 is an example diagram illustrating implementation of soft start control depending on one or more monitored parameters according to embodiments herein.

FIG. 7A is an example timing diagram illustrating generation of multiple control signals according to embodiments herein.

FIG. 8 is an example diagram illustrating computer processor hardware and related software instructions that execute methods according to embodiments herein.

FIG. 9 is an example diagram illustrating a method according to embodiments herein.

FIG. 10 is an example diagram illustrating assembly of a circuit according to embodiments herein.

Figure 1:
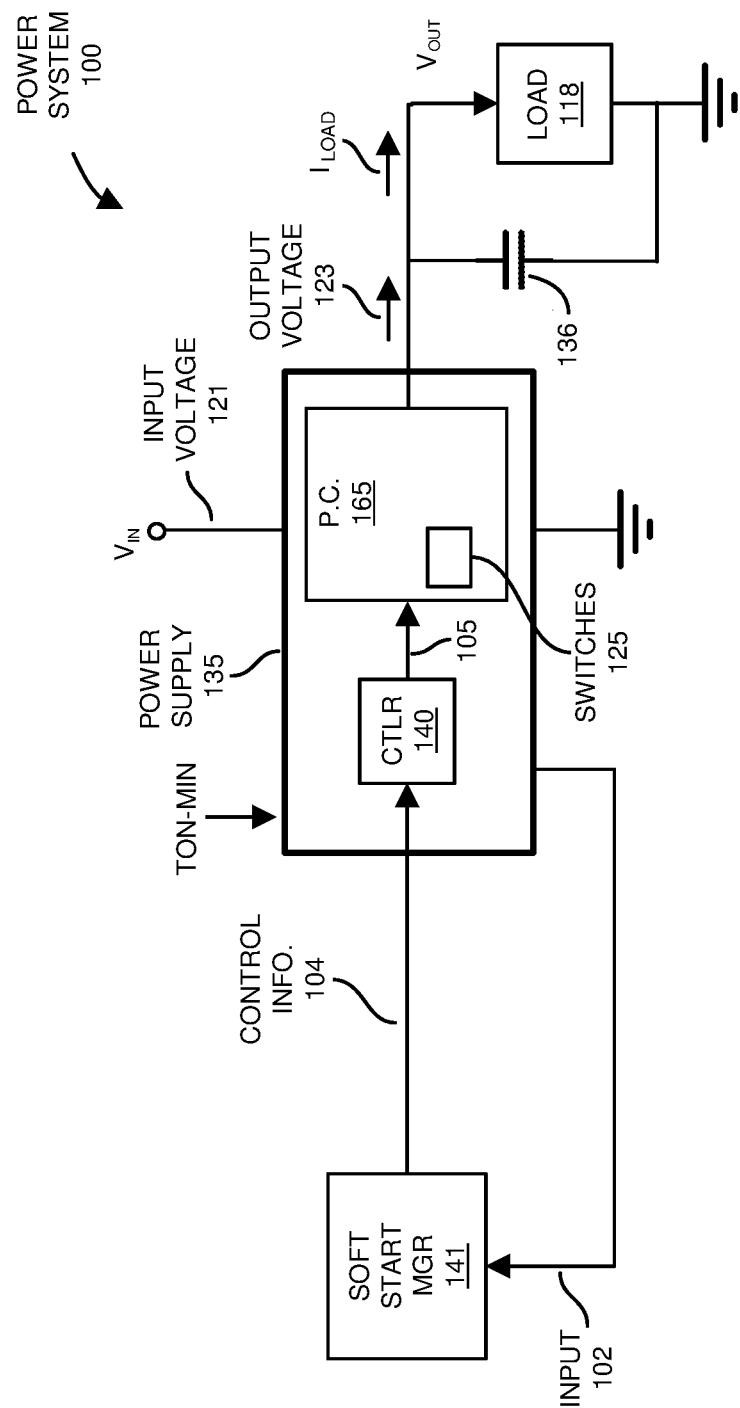
FIG. 1 is an example general diagram of a power supply and implementation of soft start management according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, embodiments herein include an apparatus to control a period of operating switches in a power supply to generate an output voltage. The apparatus includes a power converter and a soft start manager such as implemented via hardware, software, or a combination of hardware and software. High side switch circuitry in the power converter requires activation equal to or greater than a minimal ON-time value. Operation of the soft start manager provides improved regulation of the power converter, especially at lower voltage magnitudes.

More specifically, during operation, the soft start manager receives input (one or more parameters such as output voltage, duty cycle, input voltage, etc.) associated with a power converter. In one embodiment, the input is an input parameter. As its name suggests, the power converter converts the input voltage into an output voltage that powers a load. The soft start manager monitors a magnitude of the received input (such as one or more parameters, namely, output voltage, duty cycle, input voltage, etc.). Based at least in part on the magnitude of the monitored one or more input parameters, the soft start manager controls a switching period applied to switch circuitry in the power supply. Control of the switching period provides improved power conversion.

Now, more specifically, FIG. 1 is an example general diagram of a power supply and corresponding soft start manager according to embodiments herein.

In this example embodiment, the power system 100 includes soft start manager 141, power supply 135, and dynamic load 118.

Power supply 135 includes controller 140 and power converter 165.

Power converter 165 includes one or more switches 125 controlled by the controller 140 via control signals 105.

During operation, via control of switches 125 based at least in part on the control information 104 produced by the soft start manager 141, the power converter 165 converts the input voltage 121 (such as any suitable DC input voltage) into the output voltage 123 (such as any suitable DCC output voltage). The output voltage 123 (Vout) and corresponding generated output current (i.e., $I_{LOAD}$) supply power to the load 118.

As further shown, the soft start manager 141 receives one or more signals such as feedback signals (input 102 such as one or more input parameters) associated with the power converter 165. For example, the soft start manager 141 receives input 102 such as one or more parameters (output voltage, duty cycle, input voltage, etc.) associated with the power supply 135.

As further discussed herein, the soft start manager 141 controls generation of the output voltage 123 based on current operational conditions of the power supply 135. For example, the soft start manager 141 receives input 102 (such as feedback) from the power supply 135. The soft start manager 141 monitors a magnitude of the input 102 (one or more parameters associated with power supply 135).

Based at least in part on the magnitude of the input 102, the soft start manager 141 controls one or more parameters such as including a switching period (such as captured by controller information 104) applied to one or more switches 125 in the power supply 135, providing improved regulation of generating the output voltage 123.

In one embodiment, the controller 140 is configured to receive a control value TON–MIN, indicating a minimum ON-time value in which to control respective high side switch circuitry in the power supply 135. Implementation of the control TON–MIN ensures proper operation of the power supply 135 and prevents damage to the power supply 135.

Note that the power supply 135 operates at any suitable switching frequency between 50 KHz and 2 MHz or other any other suitable switching frequency ranges.

As further discussed herein, embodiments herein include, via the soft start manager 141, creating a monotonic soft start ramp of the output voltage 123 and enforcing minimum PWM pulse widths (as indicated by the ON-time value TON–MIN) by modulating the switching period of controlling switches 125 in the power supply 135. Modulation of the switching period during soft start provides accurate generation of the output voltage 123, even at low voltage magnitudes, where a longer switching period allows the small duty cycle to be more easily generated and the low current ripple is more easily tolerated. In one embodiment, as discussed herein, the soft start manager 141 implements a switching period that is greater than the switching period implemented during nominal operation (such as a non-soft start mode when the voltage is above a threshold level and soft start ramping is not needed). In other words, as discussed herein, the soft start manager 141 implements the longer switching periods during soft start ramping of the output voltage 123.

Figure 2:
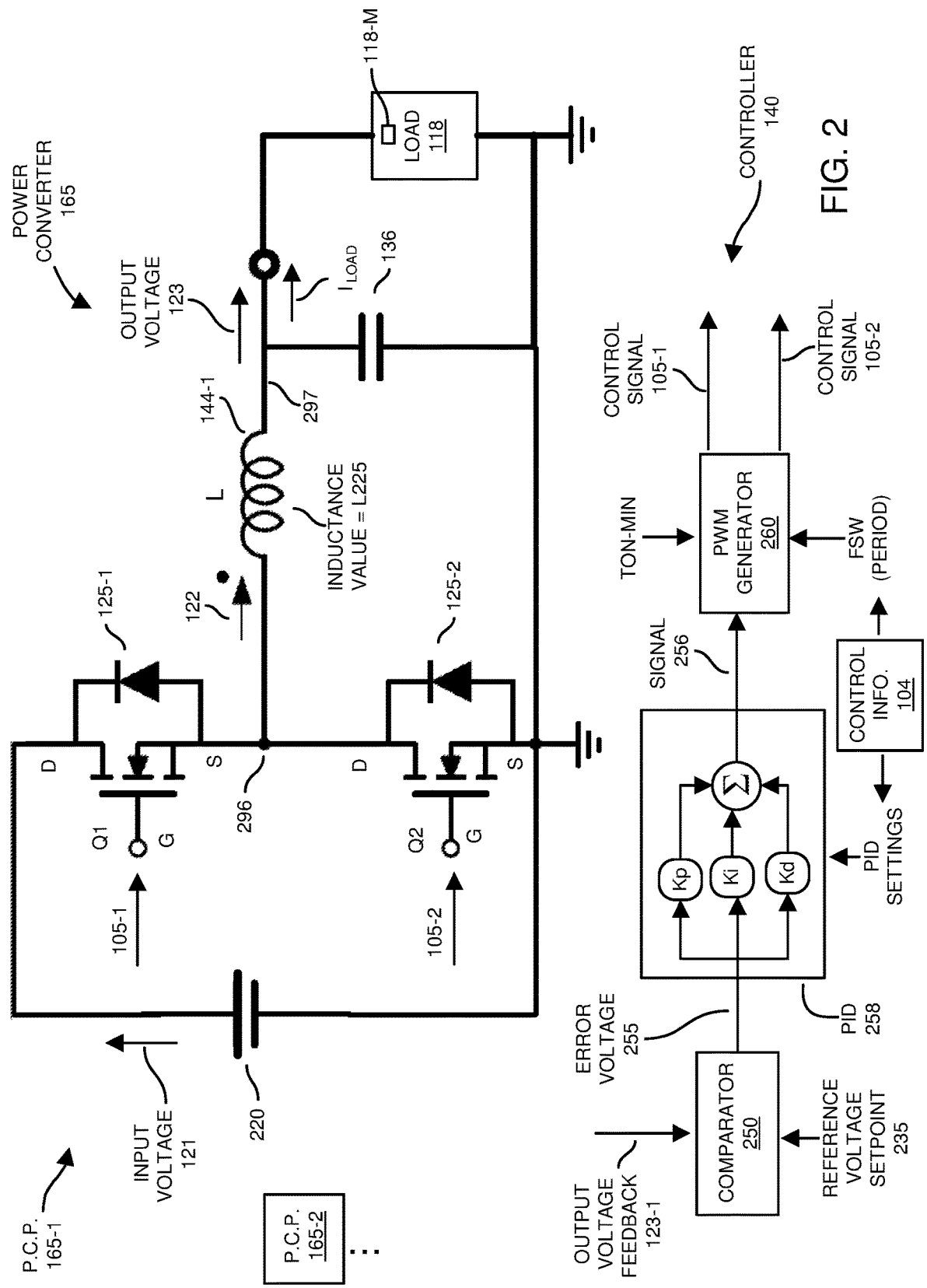
FIG. 2 is an example diagram illustrating operation of a power converter and corresponding generation of an output voltage according to embodiments herein.

FIG. 2 is an example diagram illustrating operation of a power converter and generation of an output voltage according to embodiments herein.

As previously discussed, the power converter 165 and corresponding power supply 135 can be configured as any suitable type of power converter or power converter system.

In this non-limiting example embodiment, the power converter phase 165-1 is configured as a buck converter. Power converter phase 165-1 includes voltage source 220 (providing input voltage 121), switch Q1 (high side switch circuitry 125-1), switch Q2 (low side switch circuitry 125-2), inductor 144-1, and output capacitor 136 (such as one or more capacitors).

Switches 125 (Q1, Q2, etc.) can be implemented in any suitable manner. In one embodiment, each of the switches 125 is a so-called field effect transistor. Any suitable type of switches 125 can be used to provide switching as discussed herein.

Note that the power supply 100 includes any number of power converters 165 (voltage regulators such as power converter 165-1, power converter 165-2, etc.) disposed in parallel to produce the output voltage 123. Each voltage converter such as power converter 165-2 operates in a similar manner as power converter 165-1. The power converters 165 can be operated in or out of phase with respect to each other.

Although the power converter 165-1 in FIG. 2 is shown as a buck converter configuration, note again that the power converter 165 can be instantiated as any suitable type of voltage converter and include any number of phases, providing regulation of a respective output voltage 123 as described herein.

As further shown in this example embodiment, the switch Q1 of power converter 165-1 is connected in series with switch Q2 between the input voltage source 220 and corresponding ground reference.

For example, the drain node (D) of the switch Q1 is connected to the voltage source 220 to receive input voltage 121. The switch controller 140 drives the gate node (G) of switch Q1 with control signal 105-1.

The source node (S) of the switch Q1 is connected to the drain node (D) of the switch Q2 at node 296. The switch controller 140 drives the gate node (G) of switch Q2 with control signal 105-2. The source node (S) of the switch Q2 is connected to ground.

As previously discussed, the power converter 165-1 further includes inductor 144-1. Inductor 144-1 extends from the node 296 to the output capacitor 136 and dynamic load 118.

Via switching of the switches Q1 and Q2 via respective control signal 105-1 (applied to gate G of switch Q1) and control signal 105-2 (applied to gate G of switch Q2), the node 296 coupling the source (S) node of switch Q1 and the drain (D) node of switch Q2 provides output current through the inductor 144, resulting in generation of the output voltage 123 and corresponding output current $I_{LOAD}$ powering the load 118 and energizing capacitors 136.

In general, the magnitude of the current $I_{LOAD}$ is equal to a magnitude of the output current through inductor 144-1. Output capacitor 136 reduces a ripple voltage associated with the output voltage 123.

In further example embodiments, as previously discussed, the controller 140 controls switching of the switches Q1 and Q2 based on one or more feedback parameters. For example, the controller 140 can be configured to receive output voltage feedback signal 123-1 derived from the output voltage 123 supplied to power the load 118 as previously discussed in FIG. 1. The output voltage feedback signal 123-1 can be the output voltage 123 itself or a proportional derivative voltage value thereof using a resistor divider.

Referring again to FIG. 2, via the comparator 250, the controller 140 compares the output voltage feedback signal 123-1 (such as output voltage 123 itself or derivative, or proportional signal) to the reference voltage setpoint 235.

As previously discussed, the reference voltage setpoint 235 is a desired setpoint in which to control a magnitude of the output voltage 123 during load-line regulation implemented by the power supply 135.

In one embodiment, the voltage manager 118-M in or associated with the dynamic load 118 provides control information or feedback (such as a VID value) indicating a desired reference voltage setpoint 235. In other words, the voltage manager 118-M can be configured to provide feedback to the controller 140 indicating a magnitude in which to produce the output voltage 123. In further example embodiments, the feedback such as VID value is used to produce the reference voltage setpoint 235.

As further shown, the amplifier or comparator 250 produces a respective error voltage 255 based on a difference between the output voltage feedback signal 123-1 and the reference voltage 235. A magnitude of the error voltage 255 generated by the amplifier or comparator 250 varies depending upon the degree to which the magnitude of the output voltage 123 is in or out of regulation (with respect to the reference voltage setpoint 235).

In one non-limiting example embodiment, the controller 140 includes PID controller 258 (control function). The PID controller 258 includes a P-component (Proportional component), I-component (Integral component), and a D-component (Derivative component) as known in the art to control operation of switches 125 (Q1 and Q2). In voltage mode control, the output of the PID can proportionally control the duty cycle or ON-time of the PWM, and the PWM pulses may be generated at a fixed or variable switching period or frequency. In current mode control, the output of the PID sets the target average current or peak current in the inductor 144-1, and the PWM pulse is dependent on the current sense information, such that the duty cycle or ON time of the PWM is generated based on the PID output and the current sense, with the PWM pulses being generated at fixed or variable switching period or frequency.

In further example embodiments, the control information 104 includes PID settings (so-called tuning parameters such as gain value Kp applied to the P-component stage, a gain value Ki applied to the I-component stage, and a gain value Kd applied to the D-component stage) produced by the soft start manager 141. Note that the PID settings (gain value Kp, gain value Ki, gain value Kd) vary depending on the monitored input 102 and conditions associated with producing the output voltage 123.

As further shown, the PWM (Pulse Width Modulation) generator 260 of the controller 140 controls operation of switching the switches Q1 and Q2 based upon the magnitude of the signal 256 (such as control output) from the PID controller 258.

For example, in general, if the error voltage 255 (and control signal 256) indicates that the output voltage 123 (of the power converter 165-1) becomes less than a magnitude of the reference voltage setpoint 235, the PWM generator 260 increases a duty cycle or frequency of activating the high side switch Q1 (thus decreasing a duty cycle of activating the low-side switch Q2) in a respective switch control cycle.

Conversely, if the error voltage 256 indicates that the output voltage 123 (of the power converter 165-1) becomes greater than a magnitude of the reference voltage setpoint 235, the PWM generator 260 decreases a duty cycle or frequency of activating the high side switch circuitry Q1 (thus increasing a duty cycle of activating the low-side switch Q2) in a respective switching control cycle.

As is known in the art, the controller 140 controls each of the switches Q1 and Q2 ON and OFF at different times to prevent short-circuiting of the input voltage 121 to the ground reference voltage. For example, for a first portion of the control cycle, when the switch Q1 is activated to an ON state, the switch Q2 is deactivated to an OFF state. Conversely, when the switch Q1 is deactivated to an OFF state, the switch Q2 is activated to an ON state.

Note that the controller 140 (via PWM generator 260) implements a dead time (both switches Q1 and Q2 OFF) between state ON-OFF and OFF-ON state transitions to prevent shorting of the input voltage 121 to the ground reference.

Via variations in the pulse with modulation (and/or frequency modulation) of controlling the respective switches Q1 and Q2, the controller 140 controls generation of the output voltage 123 such that the output voltage 123 remains within a desired voltage range with respect to the reference voltage setpoint 235.

The magnitude of current 122 through the inductor 144-1 increases when the high-side switch Q1 (such as one or more field effect transistor or other suitable component) is ON and low-side switch Q2 (such as one or more field effect transistor or other suitable component) is OFF; the magnitude of current 122 through the inductor 144-1 decreases when the high-side switch Q1 is OFF and Q2 is ON.

As previously discussed, the control information 104 received from the soft start manager 141 includes data indicating a switching period of producing the respective control signals 105. For example, as previously discussed, the soft start manager 141 monitors the input 102 such as one or more of the magnitude of the output voltage 123, magnitude of the input voltage 121, duty cycle of operating switches 125, etc. As further discussed below, the control of the switching period (or switching frequency) of generating control signals 105 can be achieved in any of multiple different ways.

Figure 3:
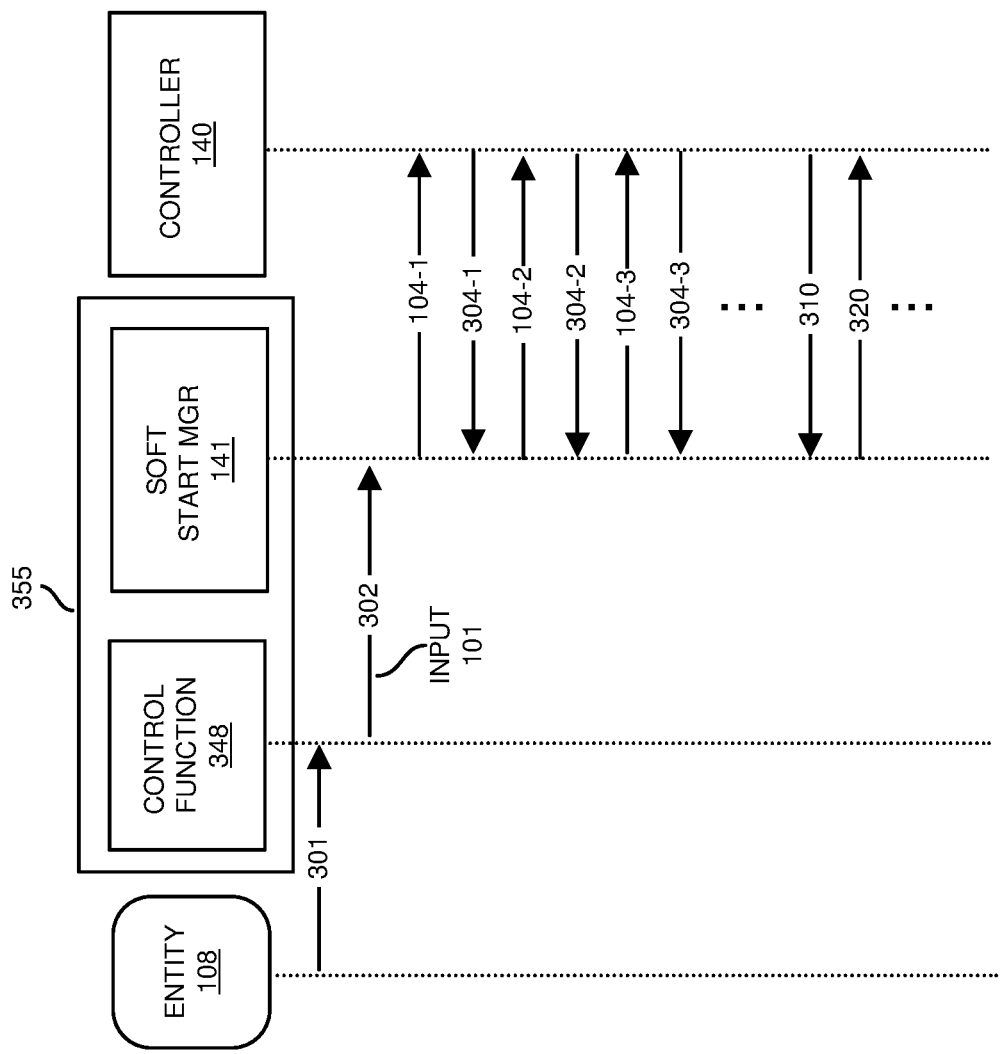
FIG. 3 is an example diagram illustrating control of a switching period according to embodiments herein.

FIG. 3 is an example diagram illustrating control of a switching period according to embodiments herein.

As shown in this example embodiment, the processor 355 (hardware) implements control function 348 and the soft start manager 141.

Initially, an entity 108 such as an enable pin associated with the processor 355 receives signal 301, causing startup of the control function 348. In response to receiving the input 301, the control function 348 generates a respective interrupt request 302. The interrupt request causes execution of the soft start manager 141 to change a magnitude of the output voltage 123 to a desired value. This may include ramping a magnitude of the output voltage 123.

The soft start manager 141 monitors the one or more input parameters such as output voltage 123, input voltage 121, duty cycle, etc., associated with generating the output voltage 123. Based on the one or more monitored parameters, the soft start manager generates control information 104-1 such as settings (such as one or more of switching period settings, PID settings, etc.) to be applied to the controller 140.

Via communications 104-1 and corresponding control information from the soft start manager 141 to the controller 140, the soft start manager 141 notifies the controller 140 of an initial switching period value to be applied to the control signals 105. In one embodiment, as further shown in FIGS. 4-6, the initial setting (magnitude) of the switching period depends on a magnitude (or current bias) of the output voltage 123. Note that the output voltage 123 may start at any suitable magnitude or voltage value.

Via communications 304-1 (such as an interrupt request or other suitable signaling to the soft start manager 141), the controller 141 acknowledges receipt of the initial switching period value and control of the signals 105 using the initial switching period value as indicated by communication 104-1. In one embodiment, the controller 141 generates the control signals with an ON-time pulse width value (of activating the high side switch circuitry 125-1) equal to or greater than the minimal pulse width (TON-MIN) to protect the power stage.

Via communications 104-2 and corresponding control information, the soft start manager 141 notifies the controller to decrement a magnitude of the switching period currently used to generate the controls signals 105.

Via communications 304-2 (such as an interrupt request or other suitable signaling to the soft start manager 141), the controller 141 acknowledges receipt of the decrement command and implemented reduction in the initial switching period value (used to produce the control signals 105) as indicated by communication 104-2. In one embodiment, the controller 141 generates the control signals with an ON-time pulse width value (of activating the high side switch circuitry 125-1) equal to or greater than the minimal pulse width (TON–MIN) to protect the power stage. The application of reduced switching period increases a magnitude of the output voltage 123.

Via communications 104-3 and corresponding control information, the soft start manager 141 notifies the controller to further decrement a magnitude of the switching period currently used to generate the controls signals 105.

Via communications 304-3 (such as an interrupt request or other suitable signaling to the soft start manager 141), the controller 141 acknowledges receipt of the decrement command and implemented reduction in the initial switching period value (used to produce the control signals 105) as indicated by communication 104-3. For example, the controller 140 notifies the soft start manager 141 when a programmed count is reached, and applied switching period is decremented by programmed slope time unit. In one embodiment, the controller 141 generates the control signals with an ON-time pulse width value (of activating the high side switch circuitry 125-1) equal to or greater than the minimal pulse width (TON–MIN). The application of reduced switching period further increases a magnitude of the output voltage 123.

Thus, the soft start manager 141 communicates switching period control information to the power supply 135. The soft start manager 141 receives feedback from the power supply 135; the feedback indicates a status of executing the switching period control information by the power supply.

Further, via communications 310, the controller 140 notifies the soft start manager 141 that the target switching period has been reached.

Via communications 320, the soft start manager 141 notifies the controller 140 that ramping has completed and that the controller 140 is able to operate in a free mode in which the counter controls the switching frequency and/or pulse width (PW) to generate the output voltage 123 without being controlled by the soft start manager 141. In other words, after completion of soft start, the controller no longer relies on the soft start manager 141 to control the switching period.

In this manner, the interrupt requests continue to provide a ramp downward until initial max period has ramped to a target steady state switching period, avoiding occurrence of glitches or large undesirable variations (voltage error) in in the output voltage 123. In one embodiment, as shown in subsequent FIGS. 4-6, the firmware executed by the processor 355 (such as control function 348 and/or soft start manager 141) disables interrupt request generation when the ramp down of the switching period is completed.

In one embodiment, any faults will return the switching period back to the initial maximum switching period value for a retry. As previously discussed, in one embodiment, different PID settings (such as gain value Kp, gain value Ki, gain value Kd) are applied during soft start and ramping of the switching period to account for the changes in the switching period (switching frequency) used to generate the control signals 105.

Additional details of controlling the switching period are shown in the following FIGS. 4-6.

Figure 4:
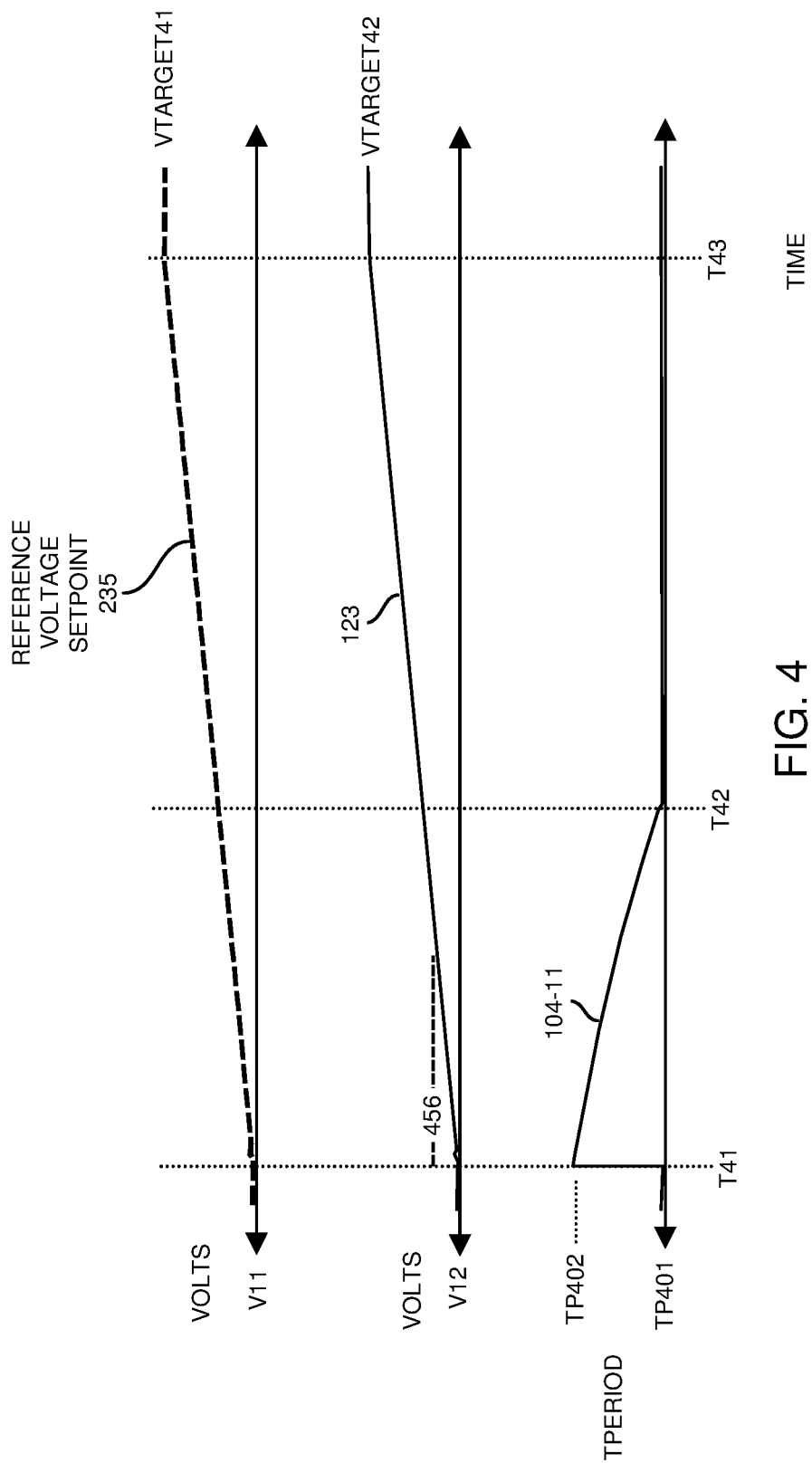
FIG. 4 is an example timing diagram illustrating ramp control of a switching period during a first instance of implementing soft start control according to embodiments herein.

FIG. 4 is an example timing diagram illustrating ramp control of a switching period during a first instance of a soft start according to embodiments herein.

In one embodiment, via generation and communication of control information 104-11 (such as one or more communications 104-1, 104-2 104-3, etc.,) from the soft start manager 141 to the controller 140 in a manner as previously discussed, the controller 140 controls the switching period according to a ramp to ramp up the output voltage 123. In other words, the controller 140 implements a control rule of preventing a magnitude of the pulse width (PW) of activating the high side switch circuitry from falling below the threshold level TON–MIN. The switching period must be greater than a magnitude of the minimum ON-time value TON–MIN.

More specifically, at time T41, the output voltage 123 is set to voltage V12. In response to the input 101 (or other suitable command information) indicating to ramp the output voltage 123 from current voltage magnitude V12 to a target value such as magnitude VTARGET42, the soft start manager 141 starts the switching period (TPERIOD) at an initial value of TP402 at time T41. In a manner as discussed herein, in accordance with control information 104-11, the soft start manager 141 ramps down a magnitude of the switching period used to produce the control signals 105 between time T41 (start value of TP402) and T42 (end value of TP401). As further shown, the magnitude of the output voltage 123 ramps up in accordance with the reference voltage setpoint 235. Via implementation of the control information 104-11 indicating to ramp down the switching period (such as received in one or more communications), the controller 140 provides accurate regulation generating the magnitude of the output voltage 123 based on the reference voltage setpoint 235. In other words, as shown in in FIG. 4, the magnitude of the output voltage 123 closely tracks the reference voltage setpoint 235 even at lower voltage levels between T41 and T43 without an undesirable plateau 456.

After time T42, the soft start manager 141 discontinues controlling the switching period TPERIOD via control information 104-11 and the controller 140 implements an appropriate switching frequency and pulse width (pulse width PW greater than TON-MIN) to control high side switch circuitry 125-1 to generate the output voltage 123.

Thus, in one embodiment, the soft start manager 141 starts from an initial switching period TP402 (corresponding to voltage magnitude V12) to a desired fixed switching period TP401 during the soft start (such as at least between time T41 and time T42). During the ramping down of the switching period, larger switching periods are implemented during the beginning of the ramp (such as nearer time T41) where the undesirable minimum pulse width plateau 456 would otherwise exist. Eventually, the magnitude of the switching period decreases to value TP401, after which, the strict control is no longer needed.

Figure 5:
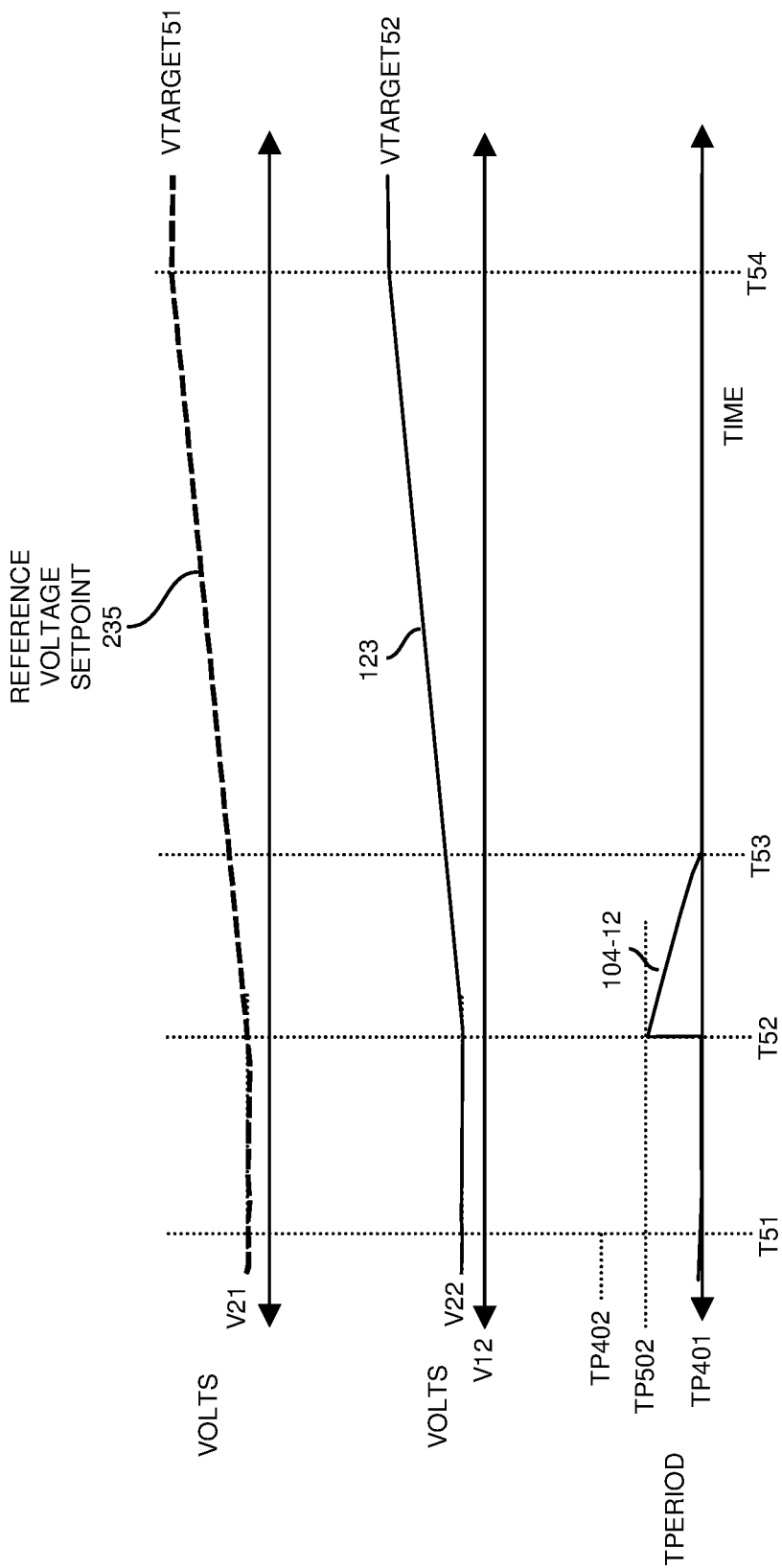
FIG. 5 is an example timing diagram illustrating ramp control of a switching period during a second instance of implementing soft start control according to embodiments herein.
Figure 6:
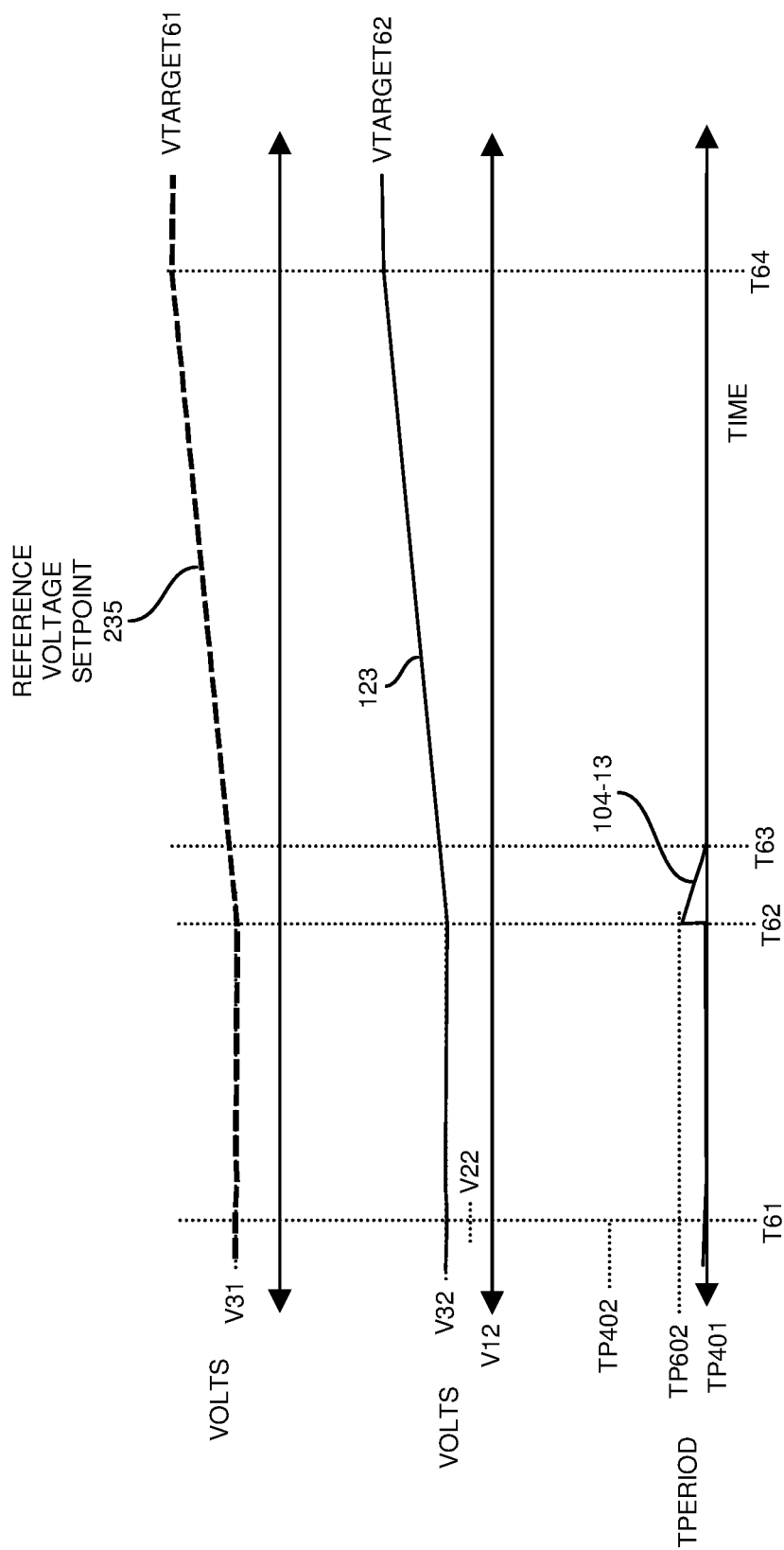
FIG. 6 is an example timing diagram illustrating ramp control of a switching period during a third instance of implementing soft start control according to embodiments herein.

Following FIGS. 5 and 6 illustrate modification of the switching period ramp control when the initial magnitude of output voltage 123 is higher. In such an instance, the duration of ramping the switching period during soft start is shorter and a magnitude of the ramp starts at a lower value.

FIG. 5 is an example timing diagram illustrating ramp control of a switching period during a second instance of a soft start according to embodiments herein.

In one embodiment, via generation and communication of control information 104-12 (such as one or more communications 104-1, 104-2 104-3, etc.) from the soft start manager 141 to the controller 140, the controller 140 controls a ramping of the switching period to ramp up the output voltage 123. In other words, the controller 140 implements a control rule of preventing a magnitude of the pulse width of activating the high side switch circuitry from falling below the threshold level TON–MIN.

More specifically, between time T51 and T52, the output voltage 123 starts at a bias voltage of V22 (which is greater than V12). At time T52, the output voltage 123 is set to voltage V22. In response to input indicating to soft start ramp the output voltage 123 from voltage V22 to a target value such as VTARGET52, the soft start manager 141 starts the switching period (TPERIOD) at an initial value of TP502 at time T52. In a manner as discussed herein, in accordance with control information 104-12, the soft start manager 141 ramps down a magnitude of the switching period between time T52 (start value of TP502) and T53 (end value of TP401). As further shown, the magnitude of the output voltage 123 ramps up (or tracks) in accordance with the reference voltage setpoint 235. Via implementation of the control information 104-12 indicating to ramp down the switching period between time T52 and T53 (such as received in one or more communications), the controller 140 provides accurate regulation generating the magnitude of the output voltage 123 based on the reference voltage setpoint 235. In other words, the magnitude of the output voltage 123 closely tracks the reference voltage setpoint 235 even at lower voltage levels between T52 and T53 without a plateau.

After time T53, the soft start manager 141 discontinues controlling the switching period TPERIOD via control information 104-12 and the controller 140 implements an appropriate switching frequency and pulse width (pulse width PW greater than TON-MIN) to control high side switch circuitry 125-1 to generate the output voltage 123.

Thus, in one embodiment, the soft start manager 141 starts from an initial switching period TP502 (corresponding to voltage V22) to a desired fixed switching period TP401 during the soft start (such as at least between time T52 and time T53). During the ramping down of the switching period used to generate control signals 105, larger switching periods are implemented during the beginning of the ramp (such as near time T52) where the undesirable minimum pulse width plateau would otherwise exist.

FIG. 6 is an example timing diagram illustrating ramp control of a switching period during a third instance of a soft start according to embodiments herein.

In one embodiment, via generation and communication of control information 104-13 (such as one or more communications 104-1, 104-2 104-3, etc.,) from the soft start manager 141 to the controller 140, the controller 140 controls the switching period of generating the control signals during soft start to ramp up the output voltage 123. In other words, the controller 140 implements a control rule of preventing a magnitude of the pulse width of activating the high side switch circuitry from falling below the threshold level TON–MIN.

More specifically, between time T61 and T62, the output voltage starts at a bias voltage of V32. At time T62, the output voltage 123 is set to voltage V32. In response to input indicating to soft start ramp the output voltage 123 from voltage V32 to a target value such as VTARGET62, the soft start manager 141 starts the switching period (TPERIOD) at an appropriate initial value of TP602 (commensurate with the magnitude of the output voltage 123 being V32) at time T62. In a manner as discussed herein, in accordance with control information 104-13, the soft start manager 141 ramps down a magnitude of the switching period between time T62 (start value of TP602) and T63 (end value of TP401). As further shown, the magnitude of the output voltage 123 ramps up in accordance with the reference voltage setpoint 235. Via implementation of the control information 104-13 indicating to ramp down the switching period (such as received in one or more communications), the controller 140 provides accurate regulation generating the magnitude of the output voltage 123 based on the reference voltage setpoint 235. In other words, the magnitude of the output voltage 123 closely tracks the reference voltage setpoint 235 even at lower voltage levels between T62 and T63 without a plateau.

After time T63, the soft start manager 141 discontinues controlling the switching period TPERIOD via control information 104-13 and the controller 140 implements an appropriate switching frequency and pulse width (pulse width PW greater than TON-MIN) to control high side switch circuitry 125-1 to generate the output voltage 123.

Thus, in one embodiment, the soft start manager 141 starts from an initial switching period TP602 (corresponding to voltage V32) to a desired fixed switching period TP401 during the soft start (such as at least between time T62 and time T63). During the ramping down of the switching period, larger switching periods are implemented during the beginning of the ramp (such as near time T62) where the undesirable minimum pulse width plateau would otherwise exist.

FIG. 7 is an example diagram illustrating implementation of soft start control according to embodiments herein.

As previously discussed, embodiments herein include generating a monotonic startup voltage ramp and enforcing a minimum pulse width PW=TON-MIN during soft start. The soft start controller 741 varies the switching period TPERIOD during the soft start ramp to allow enforcement of the minimum pulse width. By varying the off time with the fixed minimum on time the ramp can be smoothed and avoid a plateau at the beginning of the ramp where typically with a fixed frequency and minimum on time would create one.

In this example embodiment, the soft start manager 141 includes multiplexer 735, comparator 745, interrupt request generator 765, soft start controller 741, and threshold generator resource 725.

In one embodiment, the multiplexer 735 receives telemetry information such as output voltage and/or duty cycle. The soft start controller 741 selects which source to interrupt on and sets a comparator threshold TL-X from that source to generate the interrupt request such as signal 767. An interrupt handler in the soft start controller 741 (such as firmware) changes the switching period TPERIOD of generating control signals 105. Then sets second higher threshold from same source to create hysteresis. When dropping below threshold, the period is extended to its maximum and returned to its intended fixed frequency when above the hysteresis threshold.

Now, more specifically, via the input of multiplexer 735, the soft start manager 141 receives input such as one or more of the output voltage 123, duty cycle 723 (ratio of pulse width of activating the high side switch circuitry with respect to the switching period or ratio of the output voltage 123 divided by the input voltage 121), etc. The magnitude of the monitored one or more parameters such as output voltage, duty cycle, etc., provides an indication whether the soft start controller 741 needs to implement switching period control as discussed herein such that the output voltage 123 closely tracks the reference voltage setpoint.

As previously discussed, the switch circuitry 125 of the power supply includes high side switch circuitry 125-1 (see FIG. 2). The power supply 135 implements a minimum pulse width PW=TON-MIN of activating the high side switch circuitry 125-1 during soft start of the output voltage 123. The selected switching period TPERIOD varies depending on magnitudes of the monitored one or more parameters.

Note that FIG. 7A illustrates generation of control signals 105 according to embodiments herein. As discussed herein, the soft start manager 141 and corresponding switched-capacitor converter 741 controls a magnitude of the switching period, TPERIOD, during certain conditions such as when the output voltage 123 falls below a threshold value of 200 mVDC or other suitable value as indicated by map information 750-1. While implementing the minimum pulse width PW=TON-MIN, the soft start manager 141 varies a magnitude of the switching period TPERIOD based on any of one or more monitored parameters as previously discussed.

In a similar manner as previously discussed, the controller 140 can be configured to implement or include a PID (Proportional-Integral-Derivative) controller to convert the input voltage 121 into the output voltage 123; the soft start manager 141 potentially modifies settings (such as settings of gain value Kp, gain value Ki, gain value Kd) of the PID controller of the power supply 135 based on the monitored one or more parameters such as magnitude of the output voltage, duty cycle, etc.

Yet further, note that the dynamic load manager 118-M or other suitable entity can be configured to generate a respective target voltage value VID indicating a respective magnitude of generating the output voltage 123. The soft start manager 141 varies a magnitude of the switching period (TPERIOD) applied to the switch circuitry 125 in the power supply 135 depending on the magnitude of the output voltage 123 or other suitable parameter such as duty cycle.

In one embodiment, the soft start manager 141 controls a magnitude of the switching period of generating the control signals 105 to be inversely related to the magnitude of the output voltage 123. For example, as shown via map information 750-1, the soft start manager 141 implements larger switching periods as the magnitude of the output voltage 123 decreases. This ensures accurate regulation at even lower magnitudes of the output voltage 123.

More specifically, in one embodiment, the soft start controller 741 sets multiplexer 735 to monitor a magnitude of the output voltage 123. The soft start controller 741 also sets an appropriate value for the threshold value TL-X via control of the threshold generator resource 725. Based on a comparison of the magnitude of the monitored output voltage 123 to one or more different threshold values, the soft start controller 741 generates compare signal 755 indicating whether the magnitude of the output voltage 123 is greater than or less than the threshold value. In one embodiment, if the magnitude of the output voltage falls below a threshold value, the interrupt request generator 765 generates an interrupt request indicating the condition to the soft start controller 741.

In one embodiment, the soft start controller 741 implements the switching period (a.k.a., TPERIOD) settings in the map information 750-1 to control the switching period of control signals 105. For example, if the magnitude of the monitored output voltage 123 is between 150-200 mVDC, the soft start controller 141 sets the switching period (i.e., TPERIOD) to 2.5 microseconds; if the magnitude of the monitored output voltage 123 is between 100-150 mVDC, the soft start controller 141 sets the switching period to 3.33 microseconds; if the magnitude of the monitored output voltage 123 is between 50-100 mVDC, the soft start controller 141 sets the switching period to 5 microseconds; if the magnitude of the monitored output voltage 123 is between 0-50 mVDC, the soft start controller 141 sets the switching period to 10 microseconds; and so on.

Note that further embodiments herein include implementing hysteresis to provide more stable operation of the soft start manager. For example, assume that the magnitude of the output voltage transitions from 175 mVDC to 125 mVDC. Using a threshold value of 150 mVDC to monitor the output voltage 123, the transition of the output voltage 123 from 175 mVDC to 125 mVDC triggers the soft start manager 141 to generate control information 104 that changes a switching period of controlling switches 125 from around 2.5 uS to 3.3 uS as indicated by map information 750-1. However, to prevent undesirable oscillations, the soft start manager 141 requires the magnitude of the output voltage 123 to raise above an adjusted threshold level of 160 mvDC to switch from implementing a switching period of 3.3 uS to 2.5 uS.

In further example embodiments, during soft start, the power system 100 includes map information 750-2 indicating how to control settings of the switching period depending on a magnitude of the monitored duty cycle 723 in lieu of or in addition to the map information 750-1. Thus, in a similar manner as previously discussed, the soft start manager 141 and corresponding soft start controller 741 can be configured to monitor the duty cycle 723 associated with control signal 105-1 and control a magnitude of the corresponding switching period TPERIOD based on the measurement of the duty cycle via implementation of map information 750 2.

Thus, embodiments herein include, via the soft start manager 141, receiving one or more interrupt requests from the interrupt request generator 765 in response to detection (via comparator 745) of a condition in which the magnitude of the input (such as output voltage 123 or other suitable value) falls below a threshold value or in a particular range. Each of the received interrupt requests causes the soft start controller 741 of the soft start manager 141 to execute instructions to control (via generation of the control information 104) the switching period applied to the switch circuitry in the power supply 135.

FIG. 8 is an example block diagram of a computer device for implementing any of the operations as discussed herein according to embodiments herein.

As shown, computer system 800 (such as implemented by any of one or more resources such as controller 140, soft start manager 141, etc.) of the present example includes an interconnect 811 that couples computer readable storage media 812 such as a non-transitory type of media (or hardware storage media) in which digital information can be stored and retrieved, a processor 813 (e.g., computer processor hardware such as one or more processor devices), I/O interface 814, and a communications interface 817.

I/O interface 814 provides connectivity to any suitable circuitry such as one or more voltage converters 165.

Computer readable storage medium 812 can be any hardware storage resource or device such as memory, optical storage, hard drive, floppy disk, etc. In one embodiment, the computer readable storage medium 812 stores instructions and/or data used by the frequency controller application 340-1 to perform any of the operations as described herein.

Further in this example embodiment, communications interface 817 enables the computer system 800 and processor 813 to communicate over a resource such as network 190 to retrieve information from remote sources and communicate with other computers.

As shown, computer readable storage media 812 is encoded with soft start manager application 141-1 (e.g., software, firmware, etc.) executed by processor 813. Soft start manager application 141-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in soft start manager application 141-1 stored on computer readable storage medium 812.

Execution of the soft start manager application 141-1 produces processing functionality such as soft start manager process 141-2 in processor 813. In other words, the soft start manager process 141-2 associated with processor 813 represents one or more aspects of executing soft start manager application 141-1 within or upon the processor 813 in the computer system 800.

In accordance with different embodiments, note that computer system 800 can be a micro-controller device, logic, hardware processor, hybrid analog/digital circuitry, etc., configured to control a power supply and perform any of the operations as described herein.

Functionality supported by the different resources will now be discussed via flowchart in FIG. 9. Note that the steps in the flowcharts below can be executed in any suitable order.

FIG. 9 is an example diagram illustrating a method of controlling a power converter according to embodiments herein.

In processing operation 910, the soft start manager 141 receives input 102 (such as one or more magnitude output f the output voltage 123, duty cycle information, etc.) from a power supply 135. The input 102 is associated with generation of an output voltage 123 that powers a load 118.

In processing operation 920, the soft start manager 141 a magnitude of the input 102.

In processing operation 930, based at least in part on the magnitude of the input 101, the soft start manager 141 controls a switching period applied to switch circuitry 125 in the power supply 135.

FIG. 10 is an example diagram illustrating assembly of a power converter circuit on a circuit board according to embodiments herein.

In this example embodiment, assembler 1040 receives a substrate 1010 (such as a circuit board).

The assembler 1040 affixes (couples) the soft start manager 141, dynamic load 118, and power supply 135 (and corresponding components such as controller 140, power converter 165, etc.) to the substrate 1010.

Via circuit paths 1020 (such as one or more traces, electrical conductors, cables, wires, etc.), the assembler 1040 couples the soft start manager 141 to the power converter 135.

Via circuit paths 1021 (such as one or more traces, electrical conductors, cables, wires, etc.), the assembler 1040 couples the controller 140 to the power converter 165. Note that components such as the controller 140, power converter 165, and corresponding components such as soft start manager 141, etc., associated with the power supply 135 can be affixed or coupled to the substrate 1010 in any suitable manner. For example, one or more of the components in power system 100 can be soldered to the substrate, inserted into sockets disposed on the substrate 1010, etc.

Note further that the substrate 1010 is optional. Circuit paths 1020, 1021, 1022, etc., may be disposed in cables providing connectivity between the different components such as between power supply 135 and the load 118.

In one nonlimiting example embodiment, the dynamic load 118 is disposed on its own substrate independent of substrate 1010; the substrate of the dynamic load 118 is directly or indirectly connected to the substrate 1010. The soft start manager 141, controller 140, or any portion of the power supply 135 can be disposed on a standalone smaller board plugged into a socket of the substrate 1010.

In further example embodiments, via one or more circuit paths 1022 (such as one or more traces, cables, connectors, wires, conductors, electrically conductive paths, etc.), the assembler 1040 couples the power converter 165 to the load 118. In one embodiment, the circuit path 1022 conveys the output voltage 123 (and corresponding output current) generated from the power converter 165 to the load 118.

Accordingly, embodiments herein include a system comprising: a substrate 1010 (such as a circuit board, standalone board, mother board, standalone board destined to be coupled to a mother board, host, etc.); a soft start manager 141; a power converter 165 including corresponding components as described herein; and a dynamic load 118. As previously discussed, the dynamic load 118 is powered based on conveyance of output voltage 123 and corresponding current conveyed over one or more circuit paths 1022 from the power converter 165 to the dynamic load 118.

Note that the dynamic load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1010 or disposed at a remote location.

Note again that techniques herein are well suited for use in circuit applications such as those that implement power conversion. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
 a soft start manager operative to:
  receive an input parameter from a power supply, the input parameter associated with generation of an output voltage that powers a load;
  monitor a magnitude of the input parameter;
  based at least in part on the magnitude of the input parameter, control a switching period applied to switch circuitry in the power supply to soft start ramp the output voltage; and
  vary a magnitude of the switching period applied to the switch circuitry in the power supply depending on a magnitude of the output voltage.

2. The apparatus as in claim 1, wherein the input parameter is the magnitude of the output voltage.

3. The apparatus as in claim 1, wherein the input parameter is a duty cycle of activating the switch circuitry.

4. The apparatus as in claim 1, wherein the switch circuitry is high side switch circuitry; and
 wherein the power supply is configured to implement a minimum pulse width of activating the high side switch circuitry during soft start ramping of the output voltage.

5. The apparatus as in claim 1, wherein the power supply includes a controller to convert an input voltage into the output voltage.

6. The apparatus as in claim 1, wherein the soft start manager is further operative to control activation of the switch circuitry and generation of the output voltage during soft start of ramping the output voltage to a target voltage.

7. The apparatus as in claim 1, wherein a magnitude of the switching period is inversely related to the magnitude of the output voltage.

8. The apparatus as in claim 1, wherein the soft start manager is further operative to implement hysteresis during control of the switching period.

9. The apparatus as in claim 1, wherein the soft start manager is further operative to: i) communicate switching period control information to the power supply, and ii) receive feedback from the power supply, the feedback indicating a status of executing the switching period control information by the power supply.

10. A system comprising:
a circuit substrate;
the apparatus of claim 1, the apparatus coupled to the circuit substrate; and
wherein the load is coupled to the substrate.

11. A method comprising:
receiving a circuit substrate; and
coupling the apparatus of claim 1 to the circuit substrate.

12. The apparatus as in claim 1, wherein the soft start manager is further operative to control activation of the switch circuitry and generation of the output voltage during soft start of ramping the output voltage from a first voltage to a target voltage, the controlled activation including:
for a first portion of soft start ramping the output voltage, decreasing a magnitude of the switching period, the first portion being a less-than-al portion of ramping the output voltage.

13. The apparatus as In claim 12, wherein the soft start manager is further operative to:
for a second portion of the soft start ramping of the output voltage, discontinue decreasing the magnitude of the switching period, the second portion of the soft start ramping occurring after the first soft start ramping of the output voltage.

14. The apparatus as In claim 12, wherein the soft start manager is further operative to:
for a second portion of the soft start ramping the output voltage after the first portion, maintaining a magnitude of the switching period at a fixed setting.

15. The apparatus as in claim 12, wherein a starting magnitude of the switching period applied during the soft start ramping of the output voltage depends on a magnitude of the first voltage.

16. The apparatus as in claim 1, wherein a starting magnitude of the switching period applied by the soft start manager during the soft start ramping of the output voltage depends on a starting magnitude from which the output voltage is soft start ramped to a target voltage.

17. An apparatus comprising:
a soft start manager operative to:
receive an input parameter from a power supply, the input parameter associated with generation of an output voltage that powers a load;
monitor a magnitude of the input parameter;
based at least in part on the magnitude of the input parameter, control a switching period applied to switch circuitry in the power supply to soft start ramp the output voltage; and
wherein the soft start manager is further operative to control ramping of a magnitude of the switching period over time, the ramping of the magnitude of the switching period resulting in soft start ramping of the magnitude of the output voltage.

18. The apparatus as in claim 17, wherein the ramping of the magnitude of the switching period over time aligns with the soft start ramping of the magnitude of the output voltage.

19. An apparatus comprising:
a soft start manager operative to:
receive an input parameter from a power supply, the input parameter associated with generation of an output voltage that powers a load;
monitor a magnitude of the input parameter; and
based at least in part on the magnitude of the input parameter, control a switching period applied to switch circuitry in the power supply to soft start ramp the output voltage;
wherein the soft start manager is further operative to:
monitor an input voltage used by the power supply to produce the output voltage, the input parameter being the input voltage; and
control the switching period applied to the switch circuitry in the power supply based on a combination of a magnitude of the input voltage and a magnitude of the output voltage.

20. An apparatus comprising:
a soft start manager operative to:
receive an input parameter from a power supply, the input parameter associated with generation of an output voltage that powers a load;
monitor a magnitude of the input parameter;
based at least in part on the magnitude of the input parameter, control a switching period applied to switch circuitry in the power supply to soft start ramp the output voltage; and
wherein the soft start manager is further operative to receive an interrupt request in response to detection of a condition in which the magnitude of the input parameter falls below a threshold value.

21. A method comprising:
via a soft start manager:
receiving an input parameter from a power supply, the input parameter associated with generation of an output voltage that powers a load;
monitoring a magnitude of the input parameter;
based at least in part on the magnitude of the input parameter, controlling a switching period applied to switch circuitry in the power supply to soft start ramp the output voltage; and
varying a magnitude of the switching period applied to the switch circuitry in the power supply depending on a magnitude of the output voltage.

22. The method as in claim 21, wherein the input parameter is the magnitude of the output voltage.

23. The method as in claim 21, wherein the input parameter is a duty cycle of activating the switch circuitry.

24. The method as in claim 21, wherein the switch circuitry is high side switch circuitry; and
wherein the power supply is configured to implement a minimum pulse width of activating the high side switch circuitry during soft start of the output voltage.

25. The method as in claim 21, wherein the power supply includes a controller to convert an input voltage into the output voltage.

26. The method as in claim 21 further comprising:
controlling activation of the switch circuitry and generation of the output voltage during soft start of ramping the output voltage to a target voltage.

27. The method as in claim 21 further comprising:
controlling ramping of the magnitude of the switching period over time, the ramping of the switching period resulting in ramping of the magnitude of the output voltage.

28. The method as in claim 27, wherein the ramping of the magnitude of the switching period over time aligns with ramping of a magnitude of the output voltage.

29. The method as in claim 21, wherein a magnitude of the switching period is inversely related to the magnitude of the output voltage.

30. The method as in claim 17 further comprising:
monitoring an input voltage used by the power supply to produce the output voltage; and
controlling the switching period applied to the switch circuitry in the power supply based on the magnitude of the input voltage and the magnitude of the output voltage.

31. The method as in claim 21 further comprising:
implementing hysteresis during control of the switching period.

32. The method as in claim 21 further comprising:
communicating switching period control information to the power supply; and
receiving feedback from the power supply, the feedback indicating a status of executing the switching period control information by the power supply.

33. The method as in claim 21 further comprising:
receiving an interrupt request in response to detection of a condition in which the magnitude of the input parameter falls below a threshold value.

34. An apparatus comprising:
a soft start manager operative to:
  receive an input parameter from a power supply, the input parameter associated with generation of an output voltage that powers a load;
  monitor a magnitude of the input parameter;
  based at least in part on the magnitude of the input parameter, control a switching period applied to switch circuitry in the power supply to soft start ramp the output voltage; and
wherein the soft start manager is operative to implement first switching period during the soft start ramp of the output voltage, the first switching period greater than a switching period setting implemented during non-soft start operation.

* * * * *

UNITED STATES PATENT AND TRADEMARK OFFICE
CERTIFICATE OF CORRECTION

Page 1 of 1

PATENT NO. : 11,757,343 B2
APPLICATION NO. : 17/323412
DATED : September 12, 2023
INVENTOR(S) : David R. Lewis, Benjamim Tang and Venkat Sreenivas It is certified that error appears in the above-identified patent and that said Letters Patent is hereby corrected as shown below:

In the Claims

Claim 12, Line 1, replace "In" with --in--
Claim 12, Line 8, replace "less-than-al" with --less-than-all--
Claim 13, Line 1, replace "In" with --in--
Claim 14, Line 1, replace "In" with --in--
Claim 34, Line 12, replace "first" with --a first--

Signed and Sealed this
Thirty-first Day of October, 2023

Katherine Kelly Vidal
*Director of the United States Patent and Trademark Office*